(12) United States Patent
Neugebauer (10) Patent No.: US 8,593,213 B2
(45) Date of Patent: Nov. 26, 2013

(54) HIGH EFFICIENCY REGULATED CHARGE PUMP

(75) Inventor: Charles Francis Neugebauer, Los Altos, CA (US)

(73) Assignee: Store Electronic Systems, Argenteuil (FR)

( * ) Notice: Subject to any disclaimer, the term of this patent is extended or adjusted under 35 U.S.C. 154(b) by 0 days.

(21) Appl. No.: 13/392,069

(22) PCT Filed: Aug. 24, 2010

(86) PCT No.: PCT/EP2010/062289
§ 371 (c)(1),
(2), (4) Date: Jun. 7, 2012

(87) PCT Pub. No.: WO2011/023672
PCT Pub. Date: Mar. 3, 2011

(65) Prior Publication Data
US 2012/0249223 A1    Oct. 4, 2012

Related U.S. Application Data

(60) Provisional application No. 61/236,846, filed on Aug. 25, 2009.

(51) Int. Cl.
*G05F 1/10* (2006.01)
*G05F 3/02* (2006.01)

(52) U.S. Cl.
USPC .......................................................... 327/536

(58) Field of Classification Search
USPC ........................................ 327/536; 363/59–60
See application file for complete search history.

(56) References Cited

U.S. PATENT DOCUMENTS

| 5,712,777 | A | * | 1/1998 | Nicollini et al. ................. 363/60 |
| 6,002,599 | A |   | 12/1999 | Chow |
| 6,278,315 | B1 |  | 8/2001 | Kim |
| 7,142,040 | B2 | * | 11/2006 | Naka et al. ..................... 327/536 |
| 2002/0034082 | A1 | | 3/2002 | Yokomizo et al. |
| 2004/0017247 | A1 | | 1/2004 | Yasui et al. |

FOREIGN PATENT DOCUMENTS

| WO | WO 02/061931 | 8/2002 |
| WO | WO 2009/028394 | 3/2009 |

* cited by examiner

*Primary Examiner* — Quan Tra
(74) *Attorney, Agent, or Firm* — Blakely Sokoloff Taylor & Zafman (57) ABSTRACT

Described herein are systems and methods for creating high efficiency regulated charge pumps. In an exemplary embodiment, a Dickson charge pump is combined with a low voltage amplifier to create an effective class G amplifier with high voltage outputs that achieves very high power efficiency. The charge pump capacitors are alternately driven by either the charge pump circuit or a low voltage amplifier which uses negative feedback from one or more high voltage outputs to give closed loop regulation.

9 Claims, 6 Drawing Sheets (PRIOR ART)

Figure 1

(PRIOR ART)

HIGH EFFICIENCY REGULATED CHARGE PUMP

This is a non-provisional application claiming the benefit of U.S. Provisional Application No. 61/236,846, filed Aug. 25, 2009, and International Application Number PCT/EP2010/062289, filed Aug. 24, 2010.

FIELD

The disclosure relates to high efficiency regulated electronic charge pumps.

BACKGROUND INFORMATION

Charge pumps are an essential power conversion building block that finds wide application in mobile electronic devices. Charge pumps are key parts of display driver ICs, LED backlight drivers and flash memory. For many rich-media mobile devices, the display and backlight driver can dominate the power consumption; often more than half of the average power is spent through charge pumps. Improving the efficiency of charge pumps has been a semiconductor industry focus for many years given its direct impact on battery life of mobile devices.

Charge pumps constitute a class of DC-DC converters that use capacitors as the core energy conduction and storage medium; another popular class of DC-DC conversion relies on inductive components. DC-DC conversion with inductive components is ideal for many applications and can reach very high efficiency at high loads; however, these converters tend to do less well (efficiency, cost, size) at light loading. Light loads generally will require larger, more expensive inductors; in contrast, lighter load applications require only smaller and lower cost capacitors. For some light load applications (e.g. displays), charge pumps are more cost-effective, smaller and easier to design than inductive DC-DC converters.

Charge pumps that multiply a source voltage by integer or fractional values are well known in the art. With available technology, unregulated multiplying charge pumps can be made exceptionally efficient (>99%) in certain regimes of operation. However, if the source voltage is unregulated, the output will not be regulated either.

The voltage and effective impedance of a battery can vary substantially with its charge state. To create a low impedance power supply voltage from a battery, the combination of a charge pump and voltage regulator is often used. In some applications, the battery voltage is first regulated and then multiplied; in other applications the battery voltage is multiplied and then regulated. In still other implementations, the multiplier is run at a varying clock rate to control the effective charge (or current) delivered to a load; as part of a closed loop regulation, the charge pump can be seen as an ideal voltage source at the open circuit voltage prescribed by the topology of the multiplier with a variable output impedance (proportional to clock rate) that can be made part of a feedback loop to achieve regulation.

In most of the charge pump and regulator combinations, there is a linear regulator function somewhere in the design. Linear regulation has the downside of dissipating power (and dropping voltage); the unavoidable dissipation is equal to the current supplied by the regulator times the voltage drop across the regulator. It is well known in the art to take the approach of choosing the lowest input voltage possible to minimize the losses due to voltage drop across a linear regulator.

In many display charge pump applications, a number of different voltages are required (e.g. 6 or more to control the gate, source and COM signals of a TFT LCD). To reduce cost and board area the number of charge pumps and the components are minimized to save cost and by sharing functions (e.g. make a single charge pump which can deliver multiple output voltages). Often the accuracy requirements for the voltages are not the same (e.g. COM voltages require finer tuning than gate signals, for example).

The function of regulation is very similar to amplification; a negative feedback loop from the output comparing the signal to a stable reference generates a correction signal to the output driver. Open loop charge pumps often suffer from high output impedance or excessive clock frequencies (which lead to higher quiescent power) to keep impedance reasonable. Negative feedback loops can be added to a natively high impedance output source (such as a slowly clocked charge pump) to achieve a much lower output impedance and can be thus considered as an avenue for power savings by then enabling the clock frequency of the charge pump to be reduced significantly. Analog amplification with an operational amplifier will typically consume some static power; hence a tradeoff exists between charge pump clocking frequency and amplifier power. If amplifier power. If the reduction in charge pump clocking power is much larger than the increase due to the addition of an amplifier, then the overall solution can reach a lower power while meeting similar (if not better) specifications for regulation (e.g. output impedance, stability, reliability, insensitivity to manufacturing variations, etc.) since closed loop regulation is generally consider superior to open loop regulation. If the amplification power costs is low enough, there are a host of benefits from closing the loop.

For regulating high voltages with a high voltage amplifier, some quiescent bias current is typically drawn from high voltage power rails in the output stage of a high voltage amplifier. Amplifiers constructed from high voltage devices tend to be large, slow and inefficient, often requiring more bias current to offset the device limitations. Overall it is difficult to build a high voltage amplifier with good characteristics and low power, compared to low voltage amplifiers where the devices and costs are much lower. And if the voltage supply rails of the operational amplifier are significantly different from the output voltage, such an amplifier will incur the same power loss as that seen in linear regulators (equal to the voltage drop times the sourced current) which will negatively impact the efficiency. Any approach that includes negative feedback regulation of high voltages needs to consider such issues.

Analog amplifiers are broadly categorized into classes—a Class AB, for example, is a push-pull output configuration. To achieve greater efficiency, efficient DC-DC power supply ideas have been adopted by amplifier designers. Many of these advanced high efficiency amplifiers make use of inductors, at sometimes significant expense and size increase compared to the linear (e.g. Class AB) equivalent. Examples are Class D (inductor in the output) or Class H (continuously variable output supply rails from a typically inductive based DC-AC converter). Class G amplification (multi-rail) is also a possible architecture, but is often prohibitively complex (more pins, components, board area and quiescent current from HV sources) that it negates the power advantage of closed loop & low frequency charge pumps. To avoid inductors (which have difficulty reaching high efficiency, low cost and small board space at light power loads) a new topology is needed that integrates advanced amplification (e.g. a variable rail voltage or multi-rail) with charge pumps without incurring the disadvantages of the common approaches available to those skilled in the art.

The charge pump and regulation topology described herein addresses the limitations of conventional combined charge pump and regulation circuits by using a single low voltage operational amplifier to provide closed loop low impedance accurate voltage generation for a number of output voltages using a high efficiency "class G" amplifier topology integrated with a Dickson charge pump.

SUMMARY

A regulating charge pump circuit that uses a single low voltage operational amplifier to create multiple high output voltages is disclosed.

A regulating charge pump circuit that substantially lowers the charge pump switching frequency to achieve a given output impedance is disclosed.

A regulating charge pump circuit that does highly efficient multi-rail class-G amplification is disclosed.

A regulating charge pump circuit that uses charge pump flying capacitors in the regulation loop is disclosed.

A method of operating a regulated charge pump circuit, wherein the regulated charge pump circuit comprises a clocked charge pump connected to one or more pump capacitors with two terminals each, an amplifier and a feedback network, the method comprising:

performing charge pump operations, wherein a charge pump operation switches or drives one or more pump capacitor terminals; and between charge pump operations, performing voltage regulating operations wherein the amplifier drives a terminal of at least one pump capacitor and the feedback network connects to the another terminal of a pump capacitor to create a desired output voltage with the feedback network providing negative feedback from the output voltage to the amplifier.

The clocked charge pump is a Dickson charge pump.

The amplifier has lower output voltage range than the desired output voltage.

The regulating charge pump circuit comprises a power source and a plurality of pump capacitors that can be alternately connected to a charge pump circuit or an amplifier with negative feedback.

During charge pump operations, each charge pump operation transfers charge among the pump capacitors and a power source; and between charge pump operations, the amplifier is connected to the pump capacitors to drive an output voltage using at least one pump capacitor in series with the amplifier.

A regulating charge pump circuit, comprising:
one or more pump capacitors with two terminals each,
a charge pump circuit,
an amplifier circuit, wherein both the amplifier circuit and the charge pump circuit can control one or more terminals of the pump capacitors,
a feedback network,
an output switch, and
an output terminal connected to a stabilizing capacitor,
wherein the output switch connects the output terminal and the stabilizing capacitor to one terminal of a pump capacitor while the amplifier controls one or more alternative terminals of the pump capacitors and the feedback network is connected to provide negative feedback from the output terminal to the amplifier.

The charge pump is a Dickson charge pump.

The amplifier is a low voltage amplifier with insufficient output voltage range to directly drive the output terminal to the desired voltage.

the feedback network is comprised of switched capacitors.

Further objects, aspects, and advantages of the present teachings will be readily understood after reading the following description with reference to the drawings and the appended claims.

GLOSSARY OF TERMS

The following abbreviations are utilized in the following description, which abbreviations are intended to have the meanings provided as follows:

AC—alternating current
CMOS—complementary MOS (both P and N type FETs available)
COM—common electrode in an LCD device
DC—direct current
FET—field effect transistor
flying capacitor—in a charge pump, a capacitor with both terminals switched, in contrast to a stabilizing capacitor
IC—integrated circuit
LCD—liquid crystal display
MOS—metal oxide semiconductor
NMOS—N-channel MOS
PMOS—P-channel MOS
stabilizing capacitor—in a charge pump, a capacitor used to hold a nominally steady voltage with at least one terminal connected to ground or a DC level.
TFT—thin film transistor

DETAILED DESCRIPTION

Each of the additional features and teachings disclosed below may be utilized separately or in conjunction with other features and teachings to provide improved charge pumps and regulators and methods for designing and using the same. Representative examples, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the claims. Therefore, combinations of features and steps disclosed in the following detail description may not be necessary to practice the concepts described herein in the broadest sense, and are instead taught merely to particularly describe representative examples of the present teachings.

In addition, it is expressly noted that all features disclosed in the description are intended to be disclosed separately and independently from each other for the purpose of original disclosure, as well as for the purpose of restricting the subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
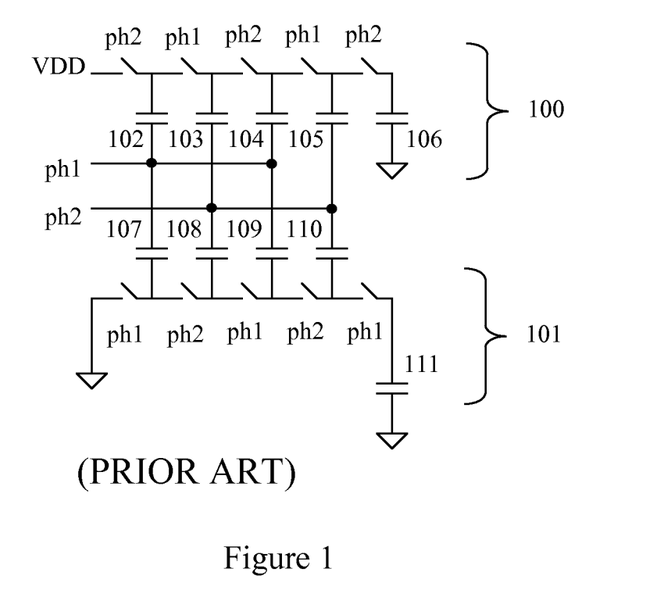
FIG. 1 shows a representative prior art schematic of a Dickson charge pump implemented with switches.

FIG. 1 shows a conventional bipolar Dickson charge pump implemented with ideal switches. In operation, the two clock phases ph1 and ph2 are driven alternately between GND and VDD which will as a consequence charge up each of the pump capacitors 102, 103, 104, 105 to integer multiples of the source voltage VDD for the positive charge pump section 100. The pump capacitors 107, 108, 109, 110 of the negative charge pump section 101 are similarly charged to negative multiples of the source voltage VDD. Two stabilizing capacitors 106 and 111 are shown to hold the final maximum and minimum voltage outputs respectively of the bipolar charge pump. To achieve good efficiency, discrete capacitors (e.g. multilayer ceramic capacitors) are often used as much higher capacitance values with lower stray capacitances (to e.g. ground) are available compared to typical on-chip capacitors.

With no load, the Dickson charge pump pump capacitors 102, 103, 104, 105, 107, 108, 109, 110 will settle to integer multiples of the clock signal voltage rail on successive Dickson pump capacitors, i.e. the first capacitor in the positive Dickson chain 102 will have VDD across it, the second 103 will have 2*VDD, the third 104 will have 3*VDD, etc. The first capacitor in the negative Dickson chain 107 will have negative VDD across it, the second 108 will have negative 2*VDD, etc. Note that the inclusion of both a positive and negative rail is not a limitation of the present invention; single sided charge pumping and regulation is considered within the scope of the present teachings.

Figure 2:
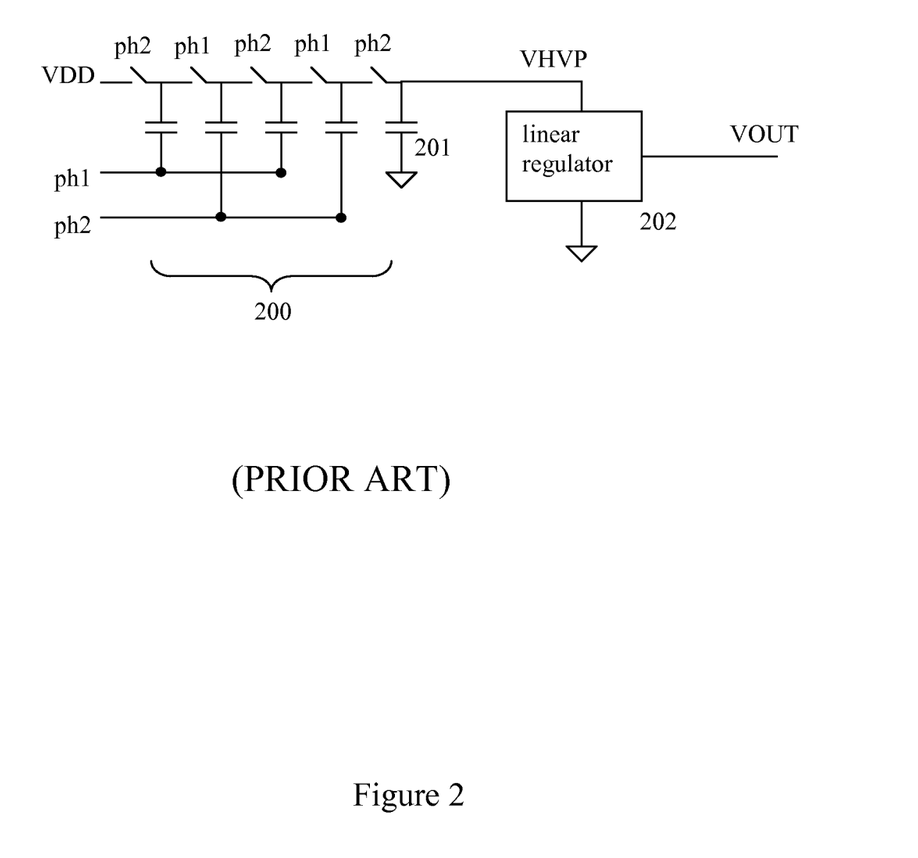
FIG. 2 shows a representative prior art schematic of a linear regulator following a charge pump.

FIG. 2 shows a representative prior art implementation of a charge pump 200 combined with a linear regulator 202. The charge pump 200 generates an outer rail VHVP stabilized by capacitor 201 to be the source voltage of the linear regulator 202, which then drives the output VOUT directly drawing power from this outer rail VHVP. When clocked with no load, the Dickson charge pump will nominally achieve an output voltage VOUT equal to 5 times the input VDD. When the desired VOUT is close to the outer power supply rail VHVP, the efficiency loss can be minor. For lower output voltages, however, the voltage drop in the output stage of the linear regulator (VHVP−VOUT) creates a significant efficiency problem. Furthermore, the output stage of the amplifier will typically require some static bias current (the quiescent current of the amplifier) to be drawn from the high voltage rail VHVP, which is very "expensive" power in the sense that current pulled from the e.g. 5*VDD outer rail shown in FIG. 2 dissipates 5 times more power than if that same current was drawn from VDD directly.

Figure 3:
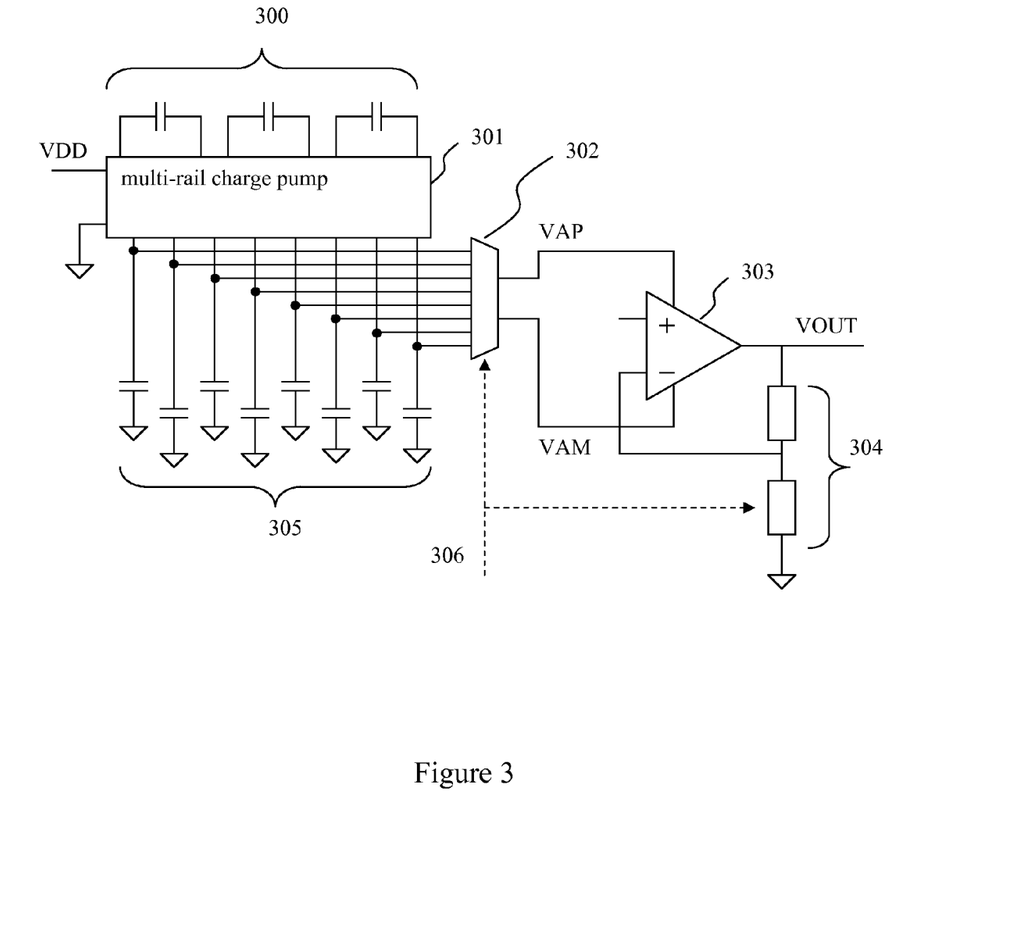
FIG. 3 shows a representative schematic of a multi-rail charge pump and a class G amplifier.

FIG. 3 shows a possible combination of a multi-rail charge pump 301 with a class G amplifier 303 to achieve higher efficiency. In operation, the multi-rail charge pump 301 using pump capacitors 300 creates a number of DC output voltages (e.g. multiples of VDD) which are stabilized on external capacitors 305. An N-to-2 multiplexor 302 select the output rails VAP and VAM for the output stage amplifier 303 so that it sinks and sources current from power supply rails that are close to the regulated output VOUT. A feedback network 304 closes the regulation loop; the feedback network 304 and the amp rail selection mux 302 are controlled by signals 306 so that the VAP and VAM selection respects the headroom requirements of amp 303.

Some downsides limit the benefits from this implementation of a class G amplifier. The output stage of the amplifier 303 has to be capable of being switched rapidly without incurring substantial power losses in transients (e.g. from the bias network). With one stabilizing capacitor per pin 305 for each of the available DC voltage rails, the number of pins and components grow substantially compared to other architectures. Furthermore, the amplifier 303 is necessarily constructed from high voltage transistors which tend to be slow and lower performance (e.g. settling time, gain) than low voltage transistors.

Figure 4:
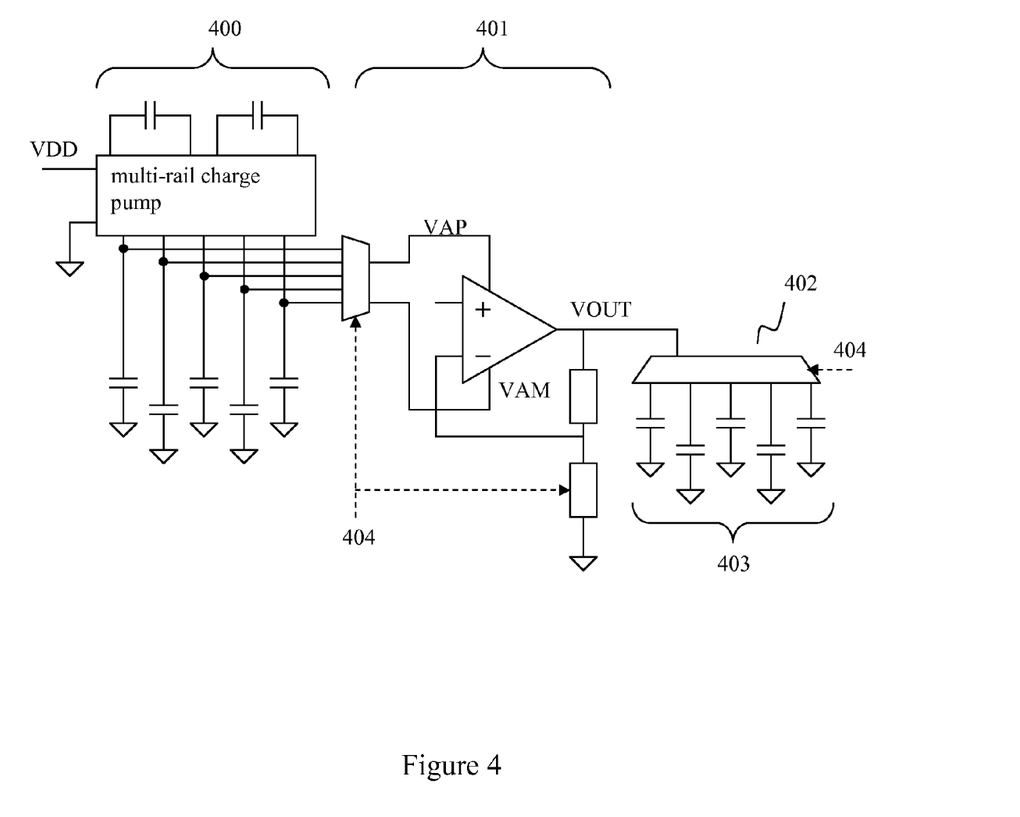
FIG. 4 shows a representative schematic of a multi-rail charge pump, a class G amplifier and an output de-multiplexor.

FIG. 4 shows a conventional combination of a multi-rail charge pump 400 and regulator 401 construction of FIG. 3 combined with an output de-multiplexor 402 which sequentially connects (one at a time) one of a set of output stabilizing capacitor 403. By sequentially sourcing the outputs 403 a single regulator 401 can be used to drive a number of output voltages. Control signals 404 control the muxing and the feedback network to configure the regulation.

Figure 5:
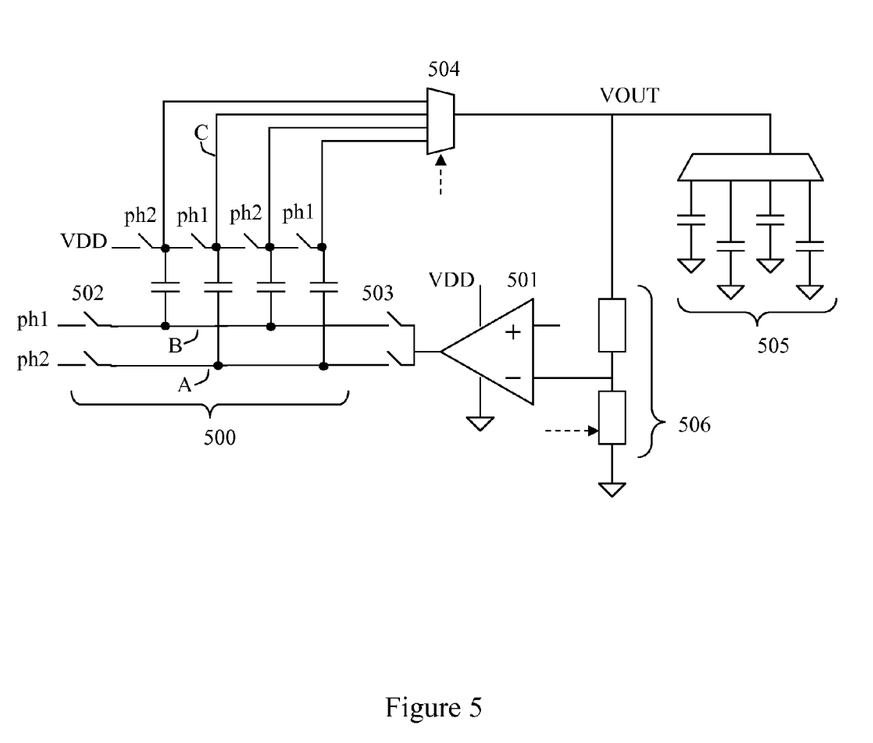
FIG. 5 shows a representative schematic of the Dickson charge pump integrated with a class G amplifier with an output de-multiplexor.

FIG. 5 shows a representative circuit schematic of the present invention. A Dickson charge pump 500 is combined with a single low voltage amplifier 501; the operation of the amplifier 501 is interleaved with the operation of the charge pump 500 through switches 502 503. When operating as a charge pump (switches 502 closed), the clock signals (A, B) are driven with alternating bi-level signals (e.g. the two levels 0 and VDD). During amplification mode when switches 503 are closed and switches 502 are open, one of the clock signals (A or B) is driven by the output of the low voltage amplifier 501 while the output multiplexor 504 connects one of the Dickson charge pump 500 nodes to the selected voltage output stabilizing capacitor 505. The feedback network 506 is switched as well and allows the low voltage amplifier 506 to stabilize stabilize VOUT at the desired high voltage. Each regulated output voltage has a pin with a stabilizing capacitor 505 which allows the sequential update of a number of output voltages.

Figure 6:
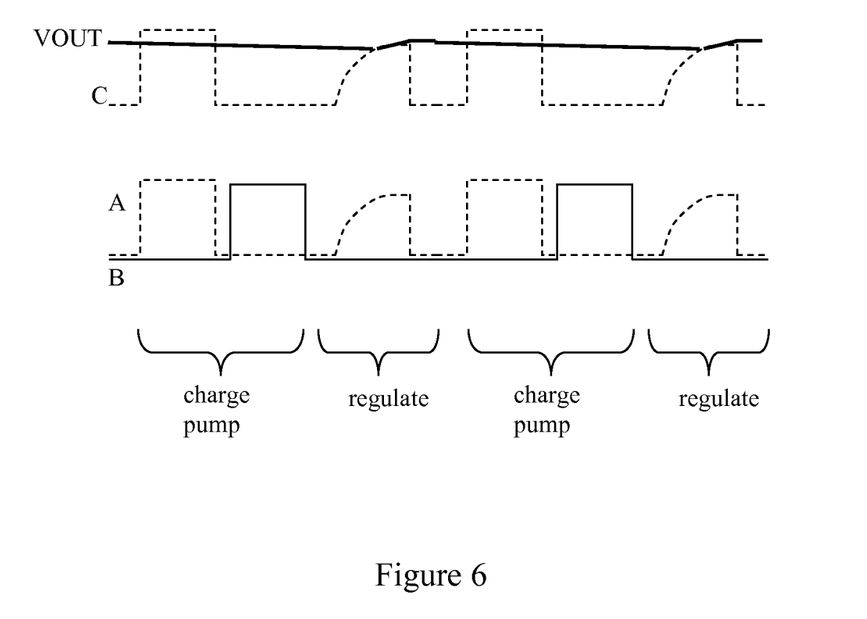
FIG. 6 shows representative timing waveforms of the regulated charge pump shown in FIG. 5.

FIG. 6 shows a representative example timing waveform diagram of the circuit of FIG. 5 refreshing a single output VOUT in between charge pump cycles. The charge pump clock signals A, B are first clocked with bi-level drive signals during the charge pump phase; switches controlled by ph1 and ph2 in FIG. 5 are open and closed at this time. Then during the regulation phase, one of the switches 503 is closed, in this example the lower one, so that the node A is driven by the amplifier. The node C voltage is thus the sum of the pump capacitor between nodes A,C (which will have ~2*VDD across it) and the output of the low voltage amplifier 501. This selected capacitor node C is connected to the output voltage VOUT using mux 504 during the regulation phase. In addition, the VOUT node is connected to the feedback network 506 during the regulation phase to close the regulation loop. Once the amplifier 501 has settled, the charge pump can go back to the charge pump mode to replenish the pump capacitors' 500 charge state.

Those skilled in the art will recognize the large number of interleaving permutations available to the designer—the charge pumping clock phase might consist of as little as a brief level where ph1 or ph2 switches are activated. Alternatively, a number of complete ph1 and ph2 cycles may be completed before entering a regulation phase. Multiple outputs may be regulated sequentially before returning to charge pumping as well. Such permutations, combinations, groupings can address various engineering objectives (e.g. improve the impedance of one or more outputs, reduce clock transition count, etc.); such design choices of interleaving particular charge pump phases and regulation outputs are considered within the scope of the present invention.

The key advantage of the present teachings over the combinations of a multi-rail charge pump and conventional class G power rail multiplexors and high voltage amplifier shown in FIGS. 3 and 4 is that the amplifier of the present teachings can be constructed with low voltage transistors which generally are much lower power, faster and smaller area than the high voltage transistors available in common mixed voltage CMOS IC processes. The increased settling settling performance of the low voltage amplifier (vs. a high voltage one) means that the amplifier can rapidly stabilize an output; this in turn opens the possibility to time-multiplex the high voltage output onto multiple stabilizing capacitors, creating many voltages from a single amplifier. Also, since the amplifier is faster, it can be shut down in between output refresh cycles at very light loads, thereby conserving even more power. Furthermore, the quiescent power dissipation of the low voltage amplifier is substantially less than the equivalent performance high voltage amplifier needed for the conventional class G amplifier. Lastly, since the low voltage amplifier's rails can be kept stable, the biasing and bias transients associated with switching amplifier rails as in a conventional class G amplifier are eliminated. All of these factors decrease the power and difficulty of integrating an amplifier to close the loop around a high impedance (but very low power) charge pump; the present teachings enable the closed loop payback to be realized by minimizing the impact of the amplifier on total power.

Those skilled in the art will recognize that the Dickson charge pump can be replaced by any multiplying or fractional charge pump with available flying capacitors. A series of doubling circuits, for example, could easily be provided that employ the ideas presented herein to drive one side of a series of one or more pump/flying capacitors with a low voltage amplifier output while closing the feedback loop around the high output voltage of the amplifier plus one or more series pump capacitors. By keeping the voltage range of the amplifier low, faster and lower power components can be used for the linear amplification and bias current power dissipation can be kept at a minimum. The specific topology of charge pump is not considered a limitation of the present teachings.

The invention claimed is:

1. A method of operating a regulated charge pump circuit, wherein the regulated charge pump circuit comprises
   a clocked charge pump connected to one or more pump capacitors with two terminals each,
   an amplifier having an output,
   a feedback network,
   switches connecting one or more terminals of the pump capacitors to clock phases driven by alternating bi-level signals,
   switches connecting the output of the amplifier to said one or more terminals of the pump capacitors,
the method comprising:
   performing charge pump operations, wherein
      a charge pump operation switches or drives one or more pump capacitor terminals, and
      switches connecting the output of the amplifier to said one or more terminals of the pump capacitors are open; and
   between charge pump operations, performing voltage regulating operations wherein:
      switches connecting one or more terminals of the pump capacitors to clock phases are open,
      at least one of the switches connecting the output of the amplifier to said one or more terminals of the pump capacitors is closed, whereby
      the amplifier drives a terminal of at least one pump capacitor, and
      the feedback network connects to the another terminal of a pump capacitor to create a desired output voltage with the feedback network providing negative feedback from the output voltage to the amplifier.

2. The method of claim 1 wherein the clocked charge pump is a Dickson charge pump.

3. The method of claim 1 wherein the amplifier has lower output voltage range than the desired output voltage.

4. The method of claim 1, wherein:
   during charge pump operations, each charge pump operation transfers charge among the pump capacitors and a power source; and
   between charge pump operations, the amplifier is connected to the pump capacitors to drive an output voltage using at least one pump capacitor in series with the amplifier.

5. A regulating charge pump circuit, comprising:
   a clocked charge pump connected to one or more pump capacitors with two terminals each,
   an amplifier having an output,
   switches connecting one or more terminals of the pump capacitors to clock phases,
   switches connecting the output of the amplifier to said one or more terminals of the pump capacitors,
   a feedback network connected to the amplifier to provide negative feedback from the output terminal to the amplifier.

6. The regulating charge pump circuit of claim 5, wherein the charge pump is a Dickson charge pump.

7. The regulating charge pump circuit of claim 5, wherein the amplifier is a low voltage amplifier with insufficient output voltage range to directly drive the output terminal to the desired voltage.

8. The regulating charge pump circuit of claim 6, wherein the feedback network is comprised of switched capacitors.

9. The regulating charge pump circuit of any one of claims 5 to 8, further comprising
   an output switch, and
   an output terminal connected to a stabilizing capacitor,
   wherein the output switch connects the output terminal and the stabilizing capacitor to one terminal of a pump capacitor.

* * * * *